United States Patent
Xu et al.

(10) Patent No.: US 8,062,618 B2
(45) Date of Patent: Nov. 22, 2011

(54) EXHAUST AFTERTREATMENT SYSTEM AND METHOD OF TREATING EXHAUST GAS

(75) Inventors: Lifeng Xu, Farmington Hills, MI (US); Harendra S Gandhi, West Bloomfield, MI (US); Robert Walter McCabe, Novi, MI (US); Clifford Norman Montreuil, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/425,986

(22) Filed: Apr. 17, 2009

(65) Prior Publication Data

US 2010/0266471 A1 Oct. 21, 2010

(51) Int. Cl.
*B01D 53/56* (2006.01)
(52) U.S. Cl. ..................................... 423/239.1; 423/235
(58) Field of Classification Search .......................... None
See application file for complete search history.

(56) References Cited

U.S. PATENT DOCUMENTS

| | | | |
|---|---|---|---|
| 5,069,697 A | 12/1991 | Hamaguchi et al. | |
| 5,727,385 A | 3/1998 | Hepburn | |
| 5,964,088 A | 10/1999 | Kinugasa et al. | |
| 6,047,542 A | 4/2000 | Kinugasa et al. | |
| 6,109,024 A | 8/2000 | Kinugasa et al. | |
| 6,133,185 A | 10/2000 | Kinugasa et al. | |
| 6,467,257 B1 | 10/2002 | Khair et al. | |
| 6,641,785 B1 | 11/2003 | Neufert et al. | |
| 6,677,264 B1 | 1/2004 | Klein et al. | |
| 6,928,806 B2 | 8/2005 | Tennison et al. | |
| 6,964,157 B2 | 11/2005 | Adelman et al. | |
| 7,062,904 B1 | 6/2006 | Hu et al. | |
| 7,094,728 B2 | 8/2006 | Yan et al. | |
| 7,097,817 B2 | 8/2006 | Brisley et al. | |
| 7,117,667 B2 | 10/2006 | Mital et al. | |
| 7,119,044 B2 | 10/2006 | Wei et al. | |
| 7,150,145 B2 | 12/2006 | Patchett et al. | |
| 7,178,331 B2 | 2/2007 | Blakeman et al. | |
| 7,181,906 B2 | 2/2007 | Dalla Betta et al. | |
| 7,188,469 B2 | 3/2007 | Bonadies et al. | |

(Continued)

FOREIGN PATENT DOCUMENTS

WO 200604315 A1 5/2006

(Continued)

OTHER PUBLICATIONS

Orlando et al., "The reactions of NO2 and CH3CHO with Na-Y zeolite and the relevance to plasma-activated lean NOx catalysis", Science Direct, Catalysis Today 89 (2004) 151-157.

(Continued)

*Primary Examiner* — Melvin Mayes
*Assistant Examiner* — Sheng H Davis
(74) *Attorney, Agent, or Firm* — Dinsmore & Shohl LLP

(57) ABSTRACT

A diesel exhaust aftertreatment system and method are provided. The system includes a lean $NO_x$ trap for reducing $NO_x$ and a transition metal-exchanged zeolite booster catalyst positioned downstream from the lean $NO_x$ trap for further reducing $NO_x$. The lean $NO_x$ trap includes a $NO_x$ adsorbent material and one or more platinum group metals, and has a platinum group metal loading of less than about 90 g/ft$^3$. The aftertreatment system provides high $NO_x$ conversion over a broad temperature range without the use of ammonia as a major reductant.

21 Claims, 8 Drawing Sheets

U.S. PATENT DOCUMENTS

| | | | |
|---|---|---|---|
| 7,189,375 B2 | 3/2007 | Molinier et al. | |
| 7,213,395 B2 | 5/2007 | Hu et al. | |
| 7,225,613 B2 | 6/2007 | Hammerle et al. | |
| 7,257,941 B1 | 8/2007 | Reuter | |
| 7,264,785 B2 | 9/2007 | Blakeman et al. | |
| 7,332,135 B2 | 2/2008 | Gandhi et al. | |
| 7,371,353 B2 | 5/2008 | Robel et al. | |
| 7,622,418 B2 | 11/2009 | Tanaka et al. | |
| 2004/0037754 A1 | 2/2004 | van Setten et al. | |
| 2004/0076565 A1 | 4/2004 | Gandhi et al. | |
| 2005/0031514 A1 | 2/2005 | Patchett et al. | |
| 2005/0232830 A1 | 10/2005 | Bruck | |
| 2006/0010859 A1 | 1/2006 | Yan et al. | |
| 2006/0100098 A1* | 5/2006 | Ura et al. | 502/325 |
| 2006/0179825 A1 | 8/2006 | Hu et al. | |
| 2006/0242947 A1* | 11/2006 | Kay et al. | 60/284 |
| 2006/0251548 A1 | 11/2006 | Willey et al. | |
| 2006/0254258 A1 | 11/2006 | Blakeman et al. | |
| 2007/0012032 A1 | 1/2007 | Hu | |
| 2007/0056268 A1 | 3/2007 | McCarthy, Jr. | |
| 2007/0079605 A1 | 4/2007 | Hu et al. | |
| 2007/0128088 A1 | 6/2007 | Willey et al. | |
| 2007/0144153 A1 | 6/2007 | Gandhi et al. | |
| 2007/0144156 A1 | 6/2007 | Gandhi et al. | |
| 2007/0157608 A1 | 7/2007 | Gandhi et al. | |
| 2007/0196246 A1 | 8/2007 | Yano | |
| 2007/0224093 A1 | 9/2007 | Miyairi et al. | |
| 2007/0238605 A1 | 10/2007 | Strehlau et al. | |
| 2007/0240402 A1 | 10/2007 | Andreasson et al. | |
| 2007/0283681 A1 | 12/2007 | Makkee et al. | |
| 2008/0006025 A1 | 1/2008 | McCarthy | |
| 2008/0127634 A1 | 6/2008 | Cho et al. | |
| 2008/0141661 A1 | 6/2008 | Voss et al. | |
| 2008/0282670 A1* | 11/2008 | McCarthy et al. | 60/274 |
| 2008/0292519 A1* | 11/2008 | Caudle et al. | 423/237 |
| 2008/0314031 A1* | 12/2008 | Shamis et al. | 60/295 |

FOREIGN PATENT DOCUMENTS

| | | |
|---|---|---|
| WO | 2007141638 A2 | 12/2007 |
| WO | 2008070551 A2 | 6/2008 |

OTHER PUBLICATIONS

Tennison et al., "NOx Control Development With Urea SCR on a Diesel Passenger Car", SAE International, 2004 SAE World Congress, Detroit, Michigan, Mar. 8-11, 2004.

Thomas Screen, "Platinum Group Metal Perovskite Catalysts", Apr. 2007; Platinum Metals Review, vol. 51 Issue 2, pp. 87-92, UK.

Timothy V. Johnson, "Diesel Emission Control in Review", 2009; SAE Int. J. Fuels Lubr, vol. 2 Issue 1, pp. 1-12.

Mark Jagner, et al., "Detection, Origin, and Effect of Ultra-Low Platinum Contamination on Diesel-SCR Catalysts", Oct. 6, 2008; SAE International Virtual Conference Center, p. 1.

D. Fino, et al., "Diesel Particulate Abatement via Wall-Flow Traps Based on Perovskite Catalysts", Sep.-Oct. 2003; PubMed, U.S. National Library of Medicine, National Institutes of Health; p. 1.

Office Action pertaining to U.S. Appl. No. 12/200,100 dated Dec. 7, 2010.

* cited by examiner

EXHAUST AFTERTREATMENT SYSTEM AND METHOD OF TREATING EXHAUST GAS

FIELD OF THE INVENTION

The present invention relates to an exhaust gas aftertreatment system and method for treating exhaust gases. More particularly, the present invention relates to a system and method which utilizes a lean $NO_x$ trap in combination with a booster catalyst to provide high $NO_x$ conversion over a broad temperature range without the use of ammonia as a major reductant.

BACKGROUND OF THE INVENTION

While diesel and lean-burn gasoline engines are known to provide beneficial fuel economy, these engines also produce oxides of nitrogen ($NO_x$) and particulates during normal operation. Several methods are known for aftertreatment of the emission stream to reduce $NO_x$ to acceptable regulatory levels.

One such method utilizes a lean $NO_x$ trap (LNT), which typically includes a $NO_x$ adsorber combined with a catalyst for $NO_x$ reduction. The LNT operates in a cycle of lean and rich exhaust conditions, i.e., the LNT stores $NO_x$ under lean (i.e., excess oxygen) exhaust conditions followed by $NO_x$ reduction over the catalyst when the engine is running under rich conditions. The reduction occurring during the rich cycle purges the LNT so that it is regenerated for the next storage cycle. The LNT typically utilizes a platinum group metal catalyst (PGM) to aid in both $NO_x$ storage and reduction. However, high concentrations of platinum metal groups are required in LNTs in order to achieve high $NO_x$ conversion levels, and such metals are relatively expensive. In addition, the reaction temperature window can be limited, and the fuel penalty associated with the rich purges can cut significantly into the fuel economy benefits of lean operation. Another problem with the use of lean $NO_x$ traps is the generation of ammonia by the trap, which may be emitted into the atmosphere during rich pulses of the LNT.

Another exhaust aftertreatment system in use utilizes a selective catalytic reduction (SCR) catalyst, which selectively reduces $NO_x$ in the presence of excess oxygen. An SCR catalyst provides $NO_x$ conversion at minimal cost compared with the use of PGM catalysts as SCR catalysts are based on transition metal oxides. However, selective catalyst reduction requires the presence of a suitable reductant species in the exhaust that reacts with $NO_x$ rather than the excess oxygen. The reductant may comprise hydrocarbons which result from the incomplete or partial oxidation of fuel. However, in diesel applications, there are often insufficient hydrocarbons present to achieve conversion of $NO_x$. In this instance, reducing agents such as urea or ammonia are carried on-board the vehicle and injected into the exhaust stream, typically upstream from the SCR catalyst. Urea-SCR technology eliminates the need for the rich purges and can potentially offer a broader operating temperature window. However, a disadvantage of liquid reductants is that freezing of the reductant may occur. Liquid reductant freezing is particularly a problem for the use of diesel vehicles in cold-weather climates when a liquid reductant is employed.

Another known exhaust aftertreatment system utilizes an LNT in combination with an $NH_3$-SCR catalyst. The $NH_3$-SCR catalyst is positioned downstream from the LNT and provides additional $NO_x$ conversion. In this configuration, the selective catalytic reduction of $NO_x$ over the SCR catalyst typically occurs via ammonia ($NH_3$) generated over the upstream LNT and not via reductant injected into the exhaust. See, for example, commonly-assigned U.S. Publication No. US 2007/0144153. The mechanism for such a system is based on ammonia forming at the LNT under rich conditions, which then slips out and is adsorbed on the downstream SCR catalyst. During the lean portion of the lean-rich cycle, $NO_x$ passing through the LNT is then reduced at the SCR catalyst using the stored $NH_3$ as a reductant. However, one drawback of this system is the need for excessively rich LNT purge conditions in order to generate $NH_3$ breakthrough (slip) from the LNT, which results in a fuel economy penalty. In addition, $NH_3$ may slip through the downstream SCR catalyst and be emitted into the atmosphere or may react on the SCR catalyst to re-form $NO_x$ under high temperature conditions.

Accordingly, there is a need for an improved exhaust aftertreatment system which has high $NO_x$ conversion over a broad range of temperatures, which does not incur significant fuel penalties, and does not suffer from the drawbacks of the use of an ammonia or urea reductant.

SUMMARY OF THE INVENTION

The present invention meets that need by providing an improved exhaust aftertreatment system and method for reducing $NO_x$ which utilizes a lean $NO_x$ trap (LNT) having a low PGM loading in combination with a booster catalyst positioned downstream from the LNT which achieves enhanced $NO_x$ conversion without requiring increases in rich purge conditions and without requiring the use of an ammonia or urea reductant. By "booster catalyst," it is meant a catalyst which efficiently reduces $NO_x$ and enhances the $NO_x$ conversion efficiency above levels achieved with an LNT alone, and which achieves $NO_x$ conversion without the use of ammonia as a primary reductant.

According to one aspect of the present invention, an exhaust gas aftertreatment system is provided comprising a lean $NO_x$ trap (LNT) positioned in an exhaust gas passage of an engine for receiving exhaust gas containing $NO_x$ and for reducing at least a portion of $NO_x$ to $N_2$, and a booster catalyst comprising a transition metal-exchanged zeolite positioned downstream from the lean $NO_x$ trap configured to further reduce $NO_x$ content in the exhaust gas.

The lean $NO_x$ trap comprises one or more platinum group metals and has a total platinum group metal loading of less than about 90 g/ft$^3$. Preferably, the lean $NO_x$ trap has a precious metal loading of between about 60 to about 80 g/ft$^3$. The lean $NO_x$ trap preferably comprises a mixture of platinum, palladium, and rhodium. The lean $NO_x$ trap further comprises a $NO_x$ adsorbent material selected from one or more alkali or alkaline earth metals.

The booster catalyst comprising the transition metal-exchanged zeolite may contain one or more metals exchanged into the zeolite structure. The exchanged transition metals are preferably selected from copper and iron.

The exhaust aftertreatment system provides $NO_x$ reduction of greater than about 80% at a temperature range of between about 175° C. and 450° C., at least 90% at a temperature range of about 200° C. to 425° C., and at least 95% at a temperature range of about 300° C. to 400° C.

In one embodiment of the invention, the system further includes an exhaust gas mixer positioned between the lean $NO_x$ trap and the booster catalyst. The exhaust gas mixer preferably has a pre-established mixing volume and includes means to promote gas mixing.

The system may further include at least one sensor for determining when the lean $NO_x$ trap needs to be purged. The system may further include at least one sensor for determining when the lean $NO_x$ trap purging needs to be terminated.

In another embodiment of the invention, the system may further include a second lean $NO_x$ trap comprising one or more platinum group metals and having a total precious metal loading of greater than about 110 g/ft$^3$, where the second lean $NO_x$ trap is used in combination with the lean $NO_x$ trap having a precious metal loading of less than 90 g/ft$^3$. In this embodiment, the second lean $NO_x$ trap is positioned upstream from the other lean $NO_x$ trap. In a preferred embodiment, the second lean $NO_x$ trap has a total precious metal loading of between about 90 and 150 g/ft$^3$ and the other lean $NO_x$ trap has a total precious metal loading of between about 30 and 90 g/ft$^3$.

A method is also provided for treating exhaust gases to reduce the $NO_x$ content thereof which comprises providing an exhaust aftertreatment system comprising a lean $NO_x$ trap and a booster catalyst positioned downstream from the lean $NO_x$ trap. The aftertreatment system is positioned in the exhaust gas passage of an engine and is exposed to exhaust gas containing $NO_x$ such that at least 80% of said $NO_x$ is converted to $N_2$ at a temperature between about 175° C. and 450° C. and wherein less than 50% of the $NO_x$ reacted at the booster catalyst reacts with ammonia that is generated during operation of said system.

Preferably, at least 80% of $NO_x$ reduction which occurs at the booster catalyst at a temperature between about 200° C. and 350° C. occurs without the production of ammonia.

The method preferably further includes purging the lean $NO_x$ trap periodically, wherein the air-fuel ratio is maintained at less than 1.0 during the purge, and wherein less than about 400 ppm of ammonia is generated during the purge.

In the method of treating exhaust gases, preferably at least 90% of the $NO_x$ is converted to $N_2$, and less than a 400 ppm spike of ammonia is generated as ammonia slip from the lean $NO_x$ trap. By "spike," it is meant a sudden increase in the emission of ammonia from the trap during purging.

Accordingly, it is a feature of the invention to provide an exhaust aftertreatment system and method for reducing $NO_x$ which utilizes low PGM loadings, which does not require an ammonia reductant, and which does not require excessively rich purge conditions. These, and other features and advantages of the invention, will become apparent from the following detailed description, the accompanying drawings, and the appended claims.

DETAILED DESCRIPTION OF THE PREFERRED EMBODIMENT

Figure 1A:
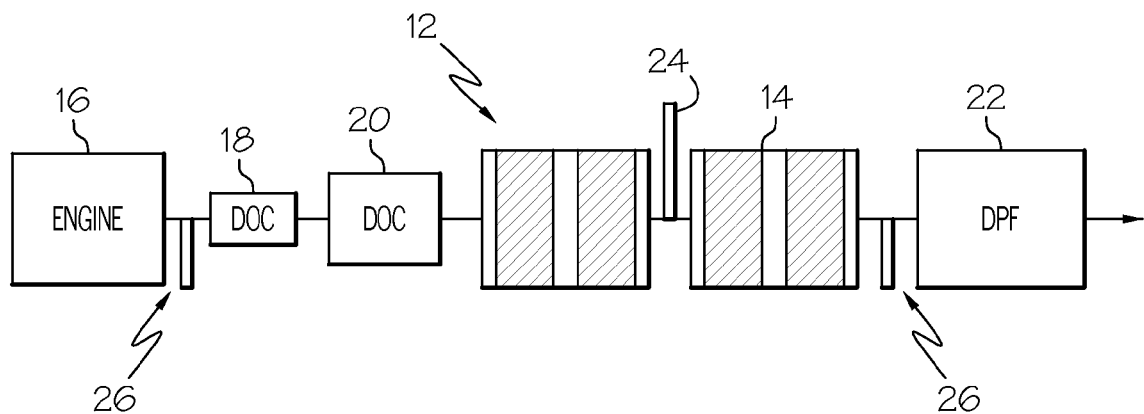
FIG. 1A is a schematic illustration of one embodiment of the exhaust gas aftertreatment system.

We have found that by combining a lean $NO_x$ trap having a low platinum group metal loading in combination with a booster catalyst, enhanced $NO_x$ conversion is achieved at a wider temperature range without the need for increased rich purges during LNT operation and with minimal production of ammonia during purging.

The exhaust aftertreatment system utilizing a LNT having a low PGM loading and a booster catalyst differs significantly from prior systems utilizing a LNT and NH$_3$-SCR catalyst in that LNT/NH$_3$-SCR catalyst systems operate by the generation of ammonia which then adsorbs on the downstream SCR catalyst for reduction of $NO_x$. In the low-loaded PGM LNT and booster catalyst system described herein, the system does not rely on ammonia generation for the majority of $NO_x$ conversion. Rather, a non-ammonia reductant is produced over the LNT which enhances $NO_x$ conversion at the booster catalyst.

The system also differs from prior SCR catalyst systems which require the use of injected urea or ammonia reductant. In the LNT-booster catalyst system, there is no need for an ammonia or urea reductant to be injected or introduced between the LNT and booster catalyst.

While not wishing to be bound by theory, it is believed that a non-ammonia reductant species is produced over the low PGM loaded LNT during rich purge conditions that adsorbs on the downstream booster catalyst and converts $NO_x$ that breaks through the LNT during subsequent lean storage periods. The non-ammonia reductant has superior characteristics in comparison with ammonia in terms of its storage and reaction with $NO_x$ over a wide range of temperatures. Also while not wishing to be bound by theory, it is believed that, based on chemical analyses of the exhaust gases and deposits formed on the booster catalyst, the primary non-ammonia reductant comprises isocyanic acid (HNCO) or related compounds.

The production of non-ammonia reductant is also believed to be enhanced by controlling the extent of the rich purge. Generally, poor $NO_x$ reduction occurs if the purge lambda value ($\lambda$) is above 1, where $\lambda$ is defined as the actual air-fuel ratio divided by the stoichiometric air-fuel ratio of the fuel used. With the combined LNT and booster catalyst system, the lambda value is controlled during LNT purge events to ensure efficient purging of the LNT without producing significant quantities of $NH_3$. This may be accomplished in several ways. For example, a $NO_x$ sensor can be used to determine when a purge event is needed based on levels of $NO_x$ breaking through the LNT. The target rich lambda (and corresponding fuel, air, and exhaust gas recirculation ((EGR) control) can be established based on various engine conditions including speed, load, engine coolant temperature (e.g., to determine whether it is the first purge event following engine start-up), successful completion of the prior purge event, etc. The duration of the purge event is also important in limiting the amount of $NH_3$ produced. The longer the rich purge conditions are held, the better the reduction of the LNT and the probability that released $NO_x$ will be reduced. One way of ensuring that $NH_3$ does not break through the LNT is to terminate the purge when a sensor still indicates a slightly lean exhaust gas composition leaving the LNT.

We have discovered that the highest $NO_x$ conversion efficiency and minimal $NH_3$ breakthrough is achieved by maintaining the air-fuel ratio (lambda) during LNT purge operations between about 0.9 and 1.0, more preferably, between about 0.92 and 0.97, and most preferably, between about 0.94 and 0.96.

$NH_3$ breakthrough may also be minimized by setting the sensor for purge termination slightly lean, i.e., lambda is greater than about 1.0 and preferably between about 1.01 and 1.03. It should be appreciated that there are other effective ways of controlling the purge events to achieve the same results as long as the purge strategy is configured such that $NH_3$ spikes released from the LNT during purge events do not exceed 1000 ppm, are preferably between about 50 and 500 ppm, and ideally are less than 50 ppm.

Referring now to FIG. 1A, a schematic illustration of the exhaust aftertreatment treatment system 10 including a lean $NO_x$ trap 12 and booster catalyst 14 is shown. As shown, the system 10 is coupled to an exhaust manifold 16 of an engine such as a diesel or lean-burn gasoline engine and may include one or more diesel oxidation catalysts 18, 20 positioned upstream from the LNT. The aftertreatment system may further include a diesel particulate filter 22 positioned downstream from the booster catalyst which captures any remaining carbonaceous particulate material in the exhaust stream. The lean $NO_x$ trap 12 and booster catalyst 14 may be contained within a housing or canister comprising first and second bricks of each.

In the embodiment shown, the exhaust system may optionally include an upstream combined $NO_x$/UEGO sensor 26 and/or a combined $NO_x$/UEGO sensor 26 located downstream of the booster catalyst. In addition, the system may include a universal heated oxygen sensor 24 (UEGO) located between the LNT and booster catalysts. The sensors 24 and 26 function to determine when the rich purge events should be initiated and terminated. Purge initiation can be activated either by monitoring the amount of $NO_x$ exposed to the LNT (upstream sensor 26) since the previous purge, or by monitoring the amount of $NO_x$ breaking through the LNT-booster catalyst system (downstream sensor 26). The purge can be terminated by monitoring the breakthrough of rich gases through the LNT (sensor 24) or by monitoring the breakthrough of rich gases through the booster catalyst (downstream sensor 26).

Figure 1B:
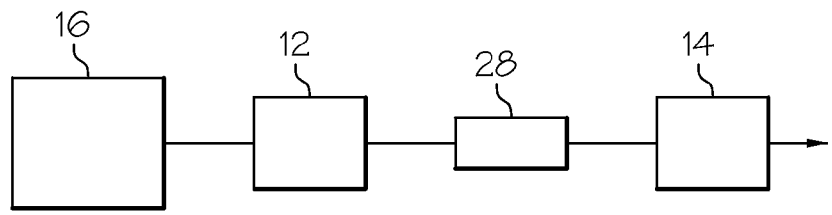
FIG. 1B is a schematic illustration of another embodiment of the exhaust gas aftertreatment system.

Referring to FIG. 1B, the system 10 may include an optional exhaust gas mixer 28 positioned between the LNT 12 and booster catalyst 14. Without wishing to be bound by theory, it is believed that the gas mixer functions to increase the amount of non-ammonia reductant species formation and/or provides better distribution of the reductant formed over the LNT throughout the downstream booster catalyst. The exhaust gas mixer 28 has a pre-established mixing volume and is preferably comprised of a specially constructed empty or baffled flow tube, or a flow tube filled with a porous mixing medium such as ceramic or metallic foam. Although the connecting tubes between elements are shown schematically as lines in FIGS. 1A-1D, it should be noted that in practice, these represent flow tubes or pipes ranging in diameter from approximately 1 to 6 inches, depending on the size of the engine and vehicle. In its simplest form, the mixing volume may consist of a stepped-down section of pipe diameter with installed vanes, baffles or other shaped elements designed to promote gas mixing.

Figure 1C:
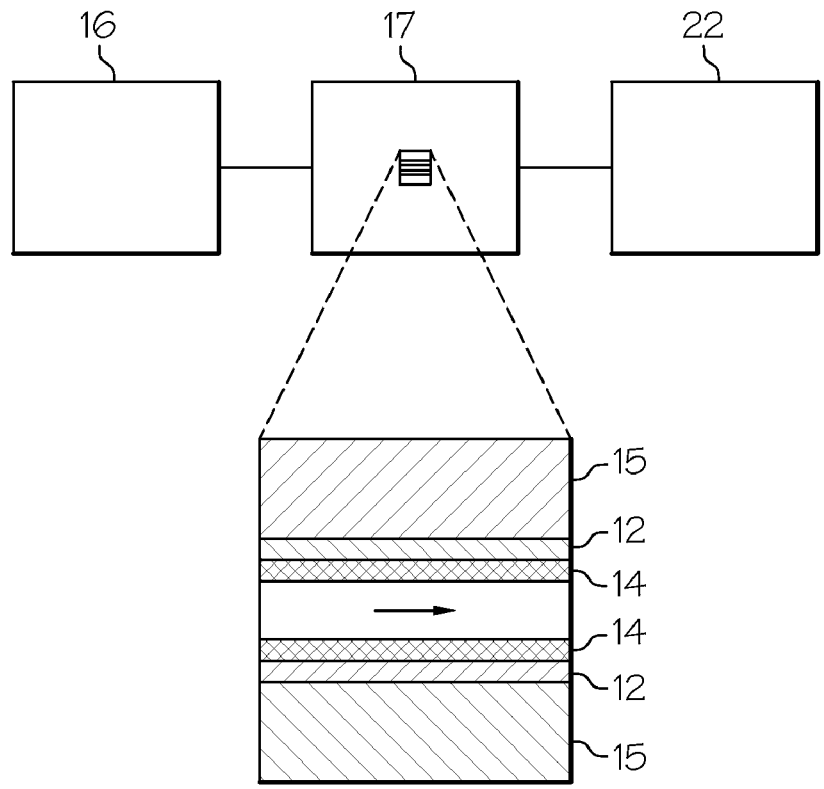
FIG. 1C is a schematic illustration of another embodiment of the exhaust gas aftertreatment system.

It should be appreciated by those skilled in the art that the LNT-booster catalyst configuration may be applied to any catalyst system configuration as long as at least a part of the booster catalyst material is arranged such that it is contacted by all or at least a part of the flowing exhaust gases after they have contacted all or at least a part of the LNT material. Possible configurations include catalyst bricks arranged in series, segmented alternating configurations of LNT and booster catalyst bricks, zone-coated catalyst bricks containing sequential zones of LNT and booster catalyst formulations, and catalyst washcoat formulations containing either mixed particles of LNT and booster catalyst formulations or layered structures of LNT and booster catalyst formulations. FIG. 1C illustrates an embodiment in which the LNT 12 and booster catalyst 14 are in a layered structure 17. The active catalyst materials are contained in a washcoat which is applied to the surface of the monolith wall material 15. The washcoat is comprised of two layers, where one layer comprises the LNT material 12 and the second layer comprises the booster catalyst material 14. It should be appreciated that the order of layers 12 and 14 may be reversed.

While the aftertreatment system typically utilizes equal size bricks of LNT and booster catalyst, it should be appreciated that the sizes of each may vary.

The LNT formulation for use in the aftertreatment system comprises a $NO_x$ adsorbent material comprising one or more alkali or alkaline earth metals and a platinum group metal selected from platinum, ruthenium, rhodium, palladium, osmium, and iridium, or mixtures thereof. A preferred LNT formulation comprises an alkaline earth adsorbent material and a mixture of platinum, palladium, and rhodium.

PGM loadings capable of achieving $NO_x$ conversion efficiencies in excess of 90% over a temperature range of about 200 to 425° C. are preferably less than about 90 g/ft$^3$, and more preferably, about 60 to about 80 g/ft$^3$. This is much lower in contrast to PGM loadings used in stand alone LNT systems or in LNT/NH$_3$-SCR catalyst systems which typically use greater than about 100 g/ft$^3$ and more typically, about 110 to about 150 g/ft$^3$. However, it should be appreciated that the PGM loadings may vary depending on a number of factors including target emission levels, engine-out emission levels, engine control characteristics, overall size of the LNT and booster catalysts, operating range of the engine and associated exhaust temperatures and flow rates, and the type and distribution of platinum group metals utilized in the LNT and the type and loading of the transition metal(s) used in the booster catalyst.

We have found that high $NO_x$ conversion efficiencies of the combined LNT-booster catalyst system is also dependent on the selection of LNT formulations with desulfation temperatures below 800° C., preferably below 750° C., and most preferably, about 700° C. or below. Typically, removal of adsorbed sulfates from the LNT (i.e., desulfation), requires rich engine operation at much higher temperatures, i.e., 800° C. and above. Preferred formulations for low-temperature desulfation are available from commercial suppliers of LNTs, such as BASF Corporation, Johnson Matthey, and Umicore, and include materials for stabilizing and dispersing the platinum group metals and the $NO_x$ storage materials. Preferred formulations for use are those that exhibit desulfation in the temperature ranges of 800° C. or below when tested in standard laboratory procedures such as described in *Society of Automotive Engineers Technical Paper No.* 2009-01-0285.

Figure 1D:
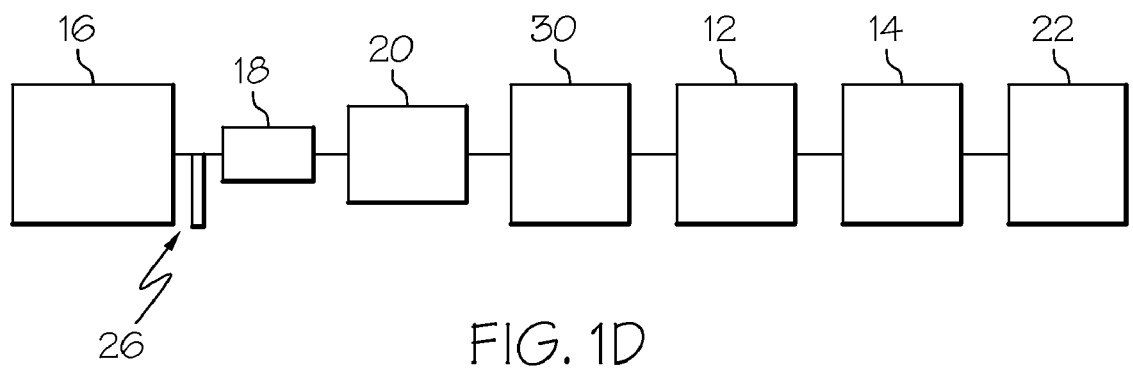
FIG. 1D is a schematic illustration of another embodiment of the exhaust gas aftertreatment system.

It should also be appreciated that the low-loaded PGM LNT may optionally be used in combination with a high-loaded PGM LNT, i.e., having a PGM loading of about 110 to 150 $g/ft^3$. In this instance, the conversion of $NO_x$ may be achieved at both high and low temperatures, providing $NO_x$ conversion over a temperature range of from about 175° C. to about 450° C. FIG. 1D illustrates this embodiment in which a second high-loaded PGM LNT 30 is positioned upstream from the low-loaded PGM LNT 12 but downstream from upstream sensor 26 and DOCs 18 and 20. The second LNT 30 preferably has a total precious metal loading of between about 90 and 150 $g/ft^3$ and the low-loaded PGM LNT preferably has a total precious metal loading of between about 30 and 90 $g/ft^3$. It should be appreciated by those skilled in the art that reverse-ordering of the high- and low-loaded PGM LNTs (i.e., high-loaded PGM LNT 30 immediately downstream of low-loaded PGM LNT 12) is another possible configuration of the combined system. Further, while the illustration in FIG. 1D shows separate high- and low-loaded PGM LNTs, an alternative configuration (not shown) is to coat a single brick with zones of high- and low-loaded PGM LNT washcoat material. Zoning can be accomplished in any of several ways including providing discrete regions of high-loaded and low-loaded PGM washcoat of various relative lengths and sequence, or for example, a linear gradient of high- to low-loaded PGM LNT washcoat material (or vice versa). In addition to extending the operating temperature range of the LNT-booster catalyst system, it is desired to minimize total PGM usage. Hence, a preferred embodiment of the low- and high-loaded PGM LNT combination is to maintain the average PGM loading equivalent to or less than that of the preferred PGM loading of 60-80 $g/ft^3$ for a system consisting only of low-loaded PGM LNT catalyst bricks. For example, a 30 $g/ft^3$ low-loaded PGM LNT could be paired with a 130 $g/ft^3$ high-loaded PGM LNT to achieve an average PGM loading of 80 $g/ft^3$.

A preferred booster catalyst for use in the aftertreatment system is a transition metal exchanged zeolite catalyst which comprises a Cu- or Fe-zeolite catalyst commercially available from suppliers of automotive catalysts such as BASF Corporation, Johnson Matthey, and Umicore. We have found that the use of such catalysts exhibit good performance, especially at lower temperature ranges. In addition, the Cu- or Fe-zeolite booster catalysts also convert substantially all of the $H_2S$ (the most noxious sulfur emission) generated during desulfation of the LNT to $SO_2$ (the least noxious sulfur emission). The transition-metal-zeolite catalysts should also display high performance and durability in urea-SCR emissions control. Such catalysts are characterized by low tendency toward storage of, and poisoning by, larger hydrocarbon molecules contained in diesel exhaust.

During engine operation, as the low-loaded PGM LNT is exposed to exhaust gas, it stores and reduces $NO_x$ in the conventional manner, i.e., reduction of $NO_x$ to $N_2$. The booster catalyst following the LNT then reduces any $NO_x$ that breaks through the LNT, thus "boosting" the $NO_x$ conversion efficiency above levels achieved with the LNT alone. Further, the LNT-booster catalyst system achieves the enhanced $NO_x$ conversion without requiring increases in the rich purge operation and while minimizing the production of ammonia formed during the purges. The peak amount of ammonia formed during purging is preferably less than about 50-400 ppm.

In order that the invention may be more readily understood, reference is made to the following examples, which are intended to be illustrative of the invention, but are not intended to be limiting in scope.

EXAMPLE 1

An LNT and booster catalyst were positioned in a laboratory reactor and tested for $NO_x$ conversion. Two catalyst configurations were used: a low-loaded PGM LNT without a booster catalyst, and a low-loaded PGM LNT with a downstream booster catalyst. In both cases, the LNT was a core sample of low-loaded PGM LNT from Johnson Matthey. The booster catalyst was a Cu-zeolite formulation available from BASF. The laboratory reactor was of the design reported in *Catalysis Letters*, Vol. 115, Nos. 3-4, June 2007, pages 108-113. The lab reactor utilized simulated exhaust gas mixtures representing fuel-lean and fuel-rich operation of an engine, with capability for switching between the lean and rich mixtures at selected intervals.

The LNT comprised a core sample of monolithic honeycomb catalyst cut from a larger monolith to cylindrical dimensions of 25 mm (diameter) and 25 mm (length) and evaluated in a quartz tube flow reactor contained in a cylindrical tube furnace used to adjust the exhaust temperatures to desired values between about 100° C. and 500° C. The LNT core sample was followed by a booster catalyst sample of the same length.

In general, the LNT and booster catalysts were subjected to various levels of aging designed to simulate aging on a vehicle. The LNT and booster catalyst cores were aged sequentially in the same laboratory reactor following a 3-mode aging procedure that simulated the most thermally harsh conditions experienced in engine operation: LNT sulfation/desulfation and diesel particulate filter regeneration. The peak aging temperature was linked to the desulfation temperature identified in the 3-mode aging process. The catalyst system was also aged hydrothermally in a large oven at 760° C. for 64 hours which correlates to 120,000 miles on a vehicle. For the specific catalyst samples shown in FIG. 2, aging was conducted for a period of time corresponding to 70,000 miles on a vehicle.

Figure 2:
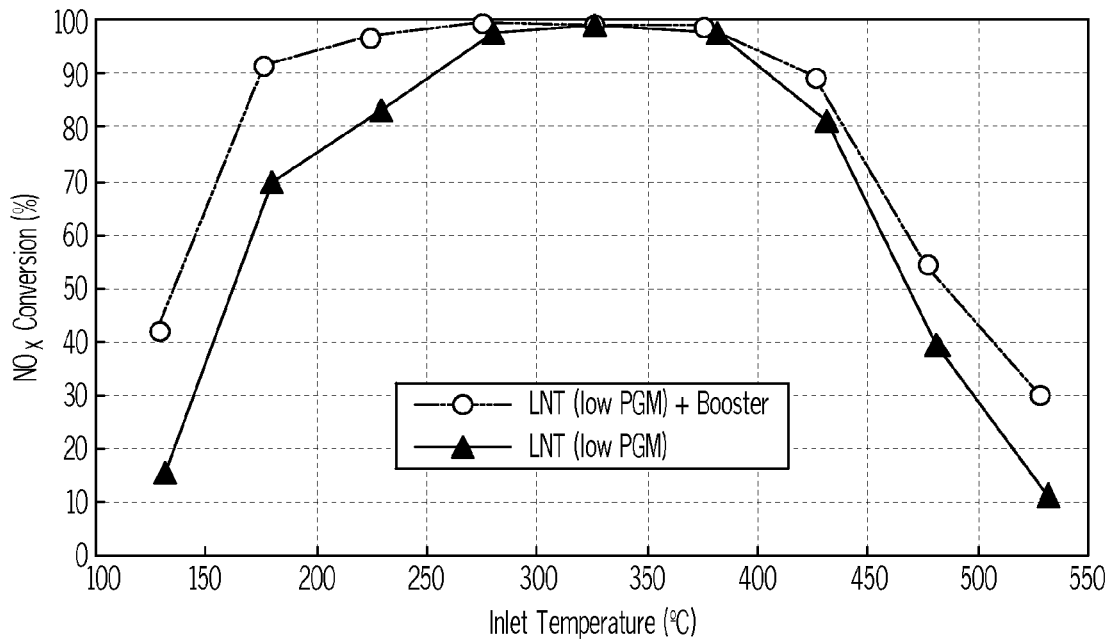
FIG. 2 is a graph illustrating average lean-rich $NO_x$ conversion efficiency as a function of LNT inlet temperature for a 50,000 simulated mile aged low PGM loading LNT with and without a downstream booster catalyst.

As shown in FIG. 2, the combined LNT and booster catalyst system showed enhanced $NO_x$ conversion in comparison to the LNT alone over the entire temperature range. In addition, the combined catalyst system achieved conversion efficiencies in excess of 90% over a temperature range of about 175° C. to 425° C. versus about 250° C. to 400° C. for the LNT alone. It can be seen that the LNT-booster catalyst system effectively expands the temperature window for high $NO_x$ conversion efficiency.

The low-loaded LNT catalyst also demonstrated efficient desulfation at temperatures between 700° C. and 750° C.

Figure 3:
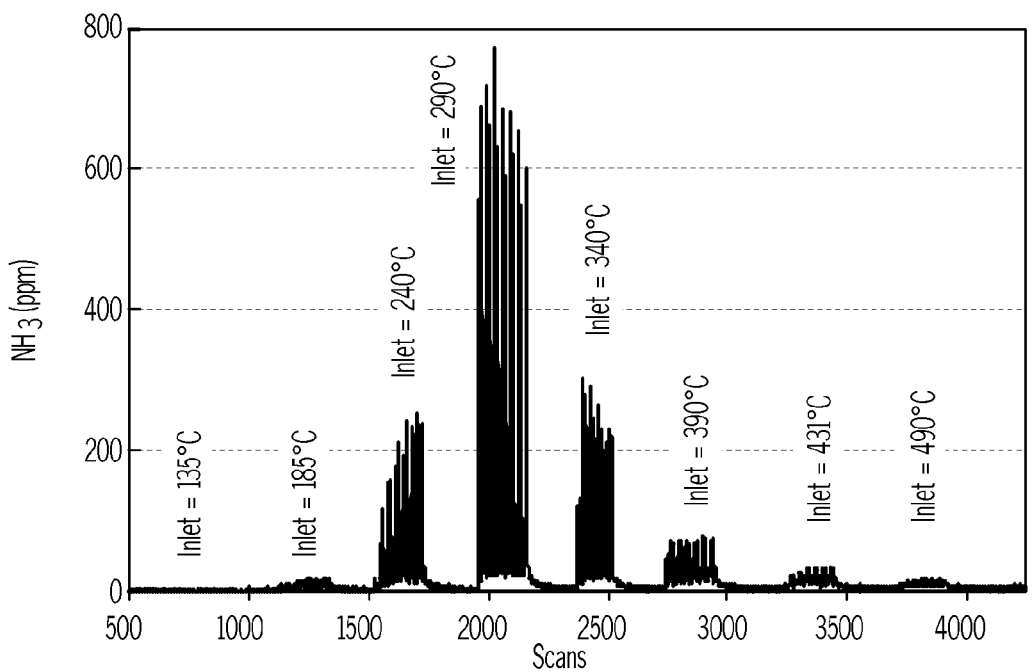
FIG. 3 is a graph illustrating ammonia emission as a function of the number of FTIR scans for various LNT inlet temperatures for the 50,000 simulated mile aged low PGM LNT without a booster catalyst.

FIG. 3 illustrates the ammonia produced over the LNT during the simulation at selected temperatures corresponding to those shown in FIG. 2. The series of peaks at each temperature correspond to ammonia released from the LNT during each 5-second rich purge during the 60 second lean/5 second rich storage-purge cycles. As can be seen, ammonia production is extremely low and/or negligible at temperatures of 225° C. and lower.

It is also noted that the catalyst efficiency data reported for the LNT vs. LNT-booster system in FIGS. 2 and 3 were both obtained at the same conditions of lean storage and rich purge, i.e., no attempt was made to adjust the purge conditions in the LNT-booster catalyst system to produce extra ammonia as would typically be done in a conventional LNT+$NH_3$-SCR catalyst system.

EXAMPLE 2

Figure 4:
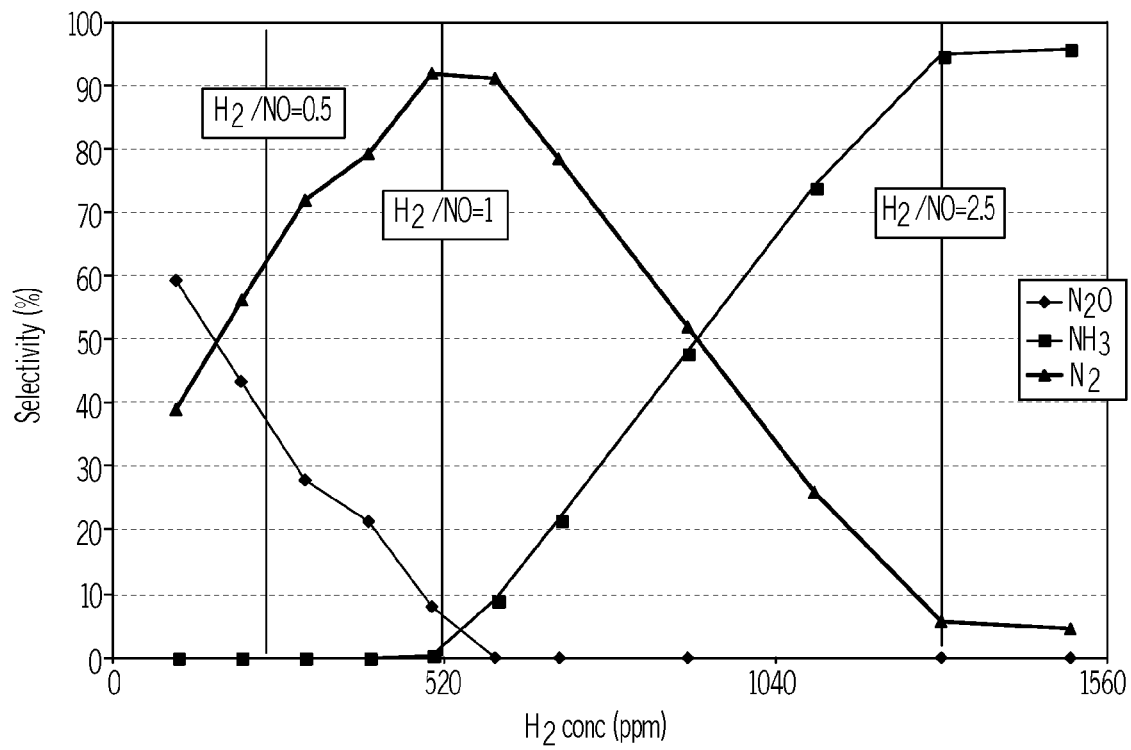
FIG. 4 is a graph showing $NO_x$ conversion selectivity as a function of hydrogen concentration for a model Pt, Ba, Al$_2$O$_3$ LNT.
Figure 5A:
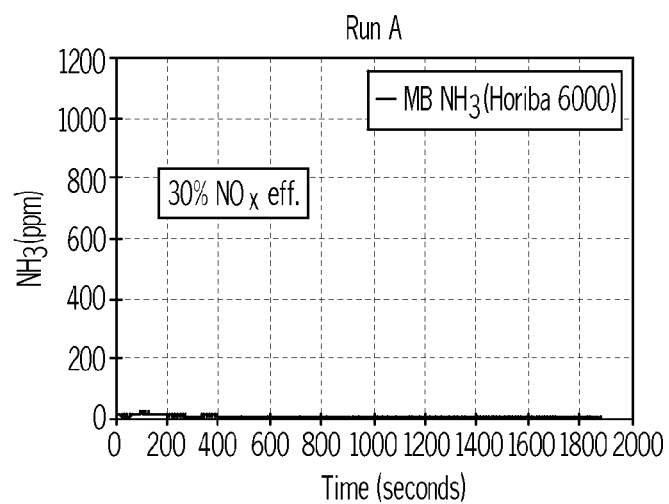
FIG. 5 is a graph illustrating the ammonia produced during a second-by-second trace of the U.S. FTP (Federal Test Procedure) for different levels of purge lambda.
Figure 5B:
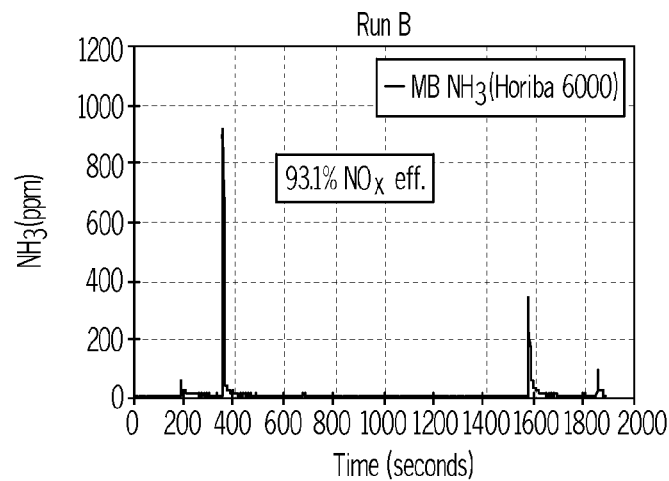
Figure 5C:
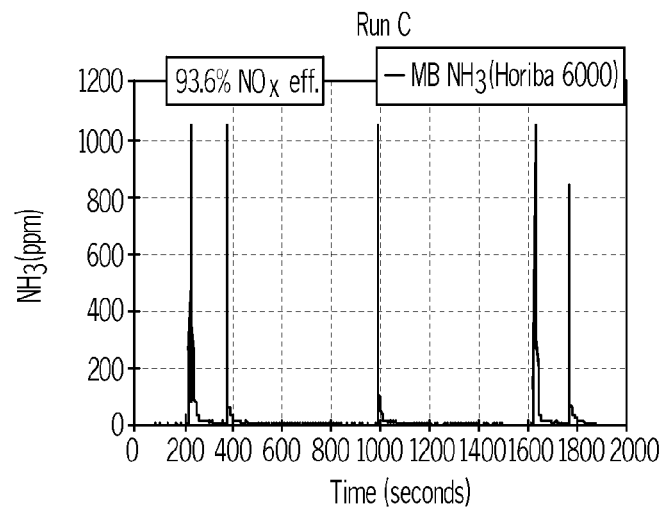
Figure 5D:
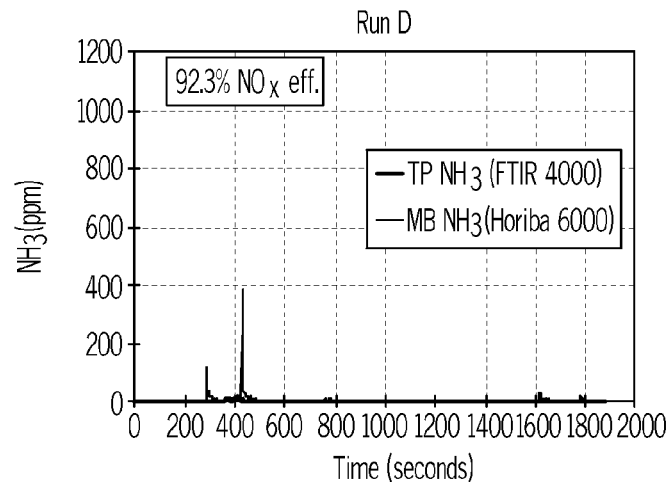

A model LNT containing only Pt, Ba and alumina (support material) was tested by reacting NO with various concentrations of $H_2$ in the gas stream. As shown in FIG. 4, increasing $H_2$ concentration corresponds to increasing richness of fuel purge which corresponds to a lower value of lambda (λ). A lambda value of less than 1 indicates a fuel-rich exhaust gas mixture. As the $H_2$ concentration in FIG. 4 increases above 520 ppm (corresponding to a 1:1 molecular ratio of NO to $H_2$), the selectivity for forming $NH_3$ begins to increase at the expense of forming $N_2$ and reaches high levels as the ratio of NO to $H_2$ approaches the ratio of 1:2.5. The latter ratio corresponds to the stoichiometric ratio for reacting NO with $H_2$ to form $NH_3$ and $H_2O$ (i.e., $5\ H_2 + 2NO = 2H_2O + 2NH_3$). The data implies that running an engine excessively rich during trap purging to generate $NH_3$ to feed to an $NH_3$-SCR catalyst pushes the $NO_x$ conversion away from the desired $NO_x$ reduction product ($N_2$) and carries a significant fuel economy penalty. The data also show that some production of $NH_3$ is inevitable under conditions that produce high selectivity for $NO_x$ conversion to $N_2$. However, we have found that the yield of $NH_3$ can be minimized by limiting the frequency of trap purge and maintaining the purge lambda at values just below the stoichiometric value of 1.0.

EXAMPLE 3

A LNT-booster catalyst system was tested on a 2.7 L diesel vehicle using the U.S. Federal Test Procedure (FTP). The results of 4 tests are shown in FIG. 5 where the purge lambda and number of purge events were adjusted to various target levels. Each plot shows the second-by-second yield of $NH_3$ as measured between the LNT and booster catalyst. Run A was a baseline test without any rich purge events. The overall $NO_x$ conversion for Run A was 30%, largely reflecting net storage of $NO_x$ by the LNT over the entire test. Run B had a 5 second rich cycle, with lambda=0.92. In Run C, lambda was equal to 0.92 and the rich cycle was cut off when lambda equaled 0.975. In Run D, lambda was equal to 0.92, and the rich cycle was cut off when lambda equaled 1.02. Runs B, C, and D had measured rich lambda average values of 0.931, 0.896, and 0.945, respectively, and $NO_x$ conversions of 93.1%, 93.6%, and 92.3%, respectively (see Table 1 below).

It is noted that Run D, with very little $NH_3$ generated by the LNT over the entire test, produced $NO_x$ conversions within a percentage point or so over the conversions achieved in the B and C runs which had much greater generation of $NH_3$. Thus, it can be seen that high overall $NO_x$ conversion can be achieved with the LNT-booster catalyst system without significant generation of $NH_3$.

Table 1 below further illustrates the test results.

TABLE 1

| Test # | Overall $NOx$ conversion (%) | Maximum $NH_3$ peak concentration (ppm) | Rich feedback control (lambda after booster catalyst) | Rich lambda average over # of rich attempts |
|---|---|---|---|---|
| A | 30 | 0.0 | n/a | n/a |
| B | 93.1 | 950 | Rich time fixed for 5 seconds | 0.931 |
| C | 93.6 | 1050 | Rich cut off at lambda = 0.975 | 0.896 |
| D | 92.3 | 380 | Rich cut off at lambda = 1.02 | 0.945 |

EXAMPLE 4

Figure 6:
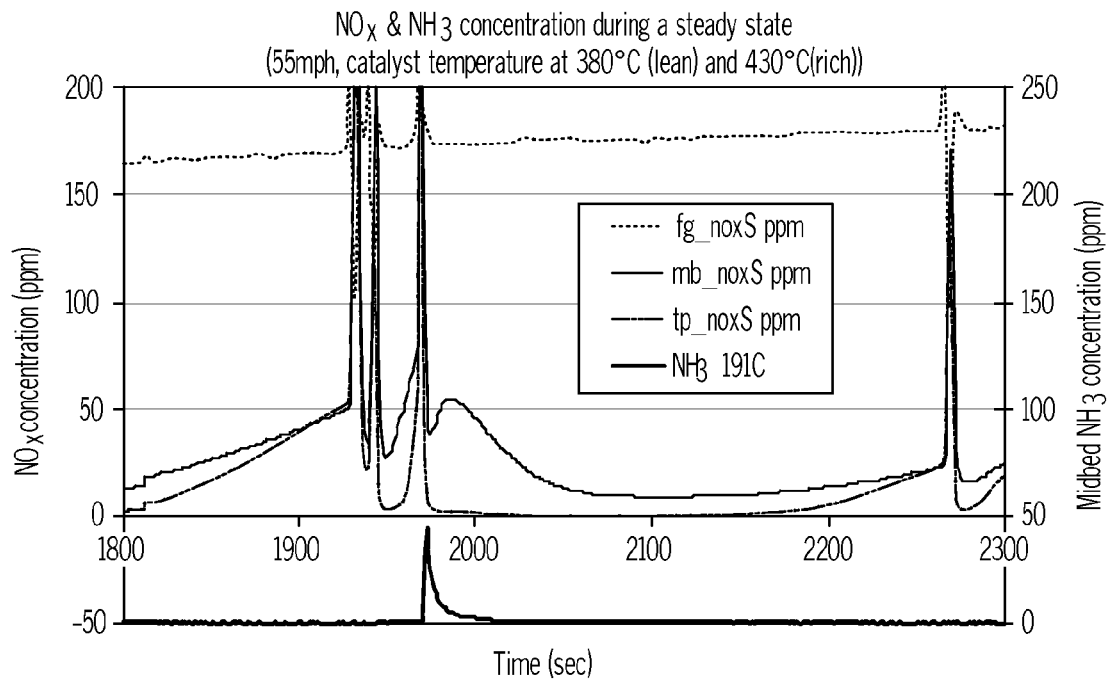
FIG. 6 is a graph illustrating $NO_x$ emissions between the LNT and booster catalyst and after the booster catalyst as a function of time during steady-speed operation of the vehicle.

A diesel vehicle as in Example 3 was provided with different LNT and booster catalyst formulations (low-loaded LNT and Cu-zeolite booster catalyst, both obtained from BASF) and was operated under steady-speed driving conditions on a chassis dynamometer. The results are shown in FIG. 6. $NO_x$ and $NH_3$ measurements were obtained both between the LNT and booster catalyst (solid line labeled mb_noxS ppm) and after the booster catalyst (dashed/dotted line labeled tp_noxS ppm). The $NO_x$ generated by the engine is indicated by the dotted line (labeled fg_noxS ppm) and was between about 160-180 ppm during the lean storage periods. A series of purge events occurred between 1900 and 2000 seconds. Prior to the purge events, the $NO_x$ measurements before and after the booster catalyst nearly came together, indicating that the booster catalyst provided little incremental conversion over that of the LNT. The purges generated the normal $NO_x$ spike from the LNT but some of the $NO_x$ released during the purge was immediately reacted (or stored) by the booster catalyst. In addition, there was almost a complete elimination of $NO_x$ emissions across the booster catalyst for a period of about 200 seconds following the last LNT purge, despite continuous breakthrough of $NO_x$ from the LNT at levels between 10 and 55 ppm. The only $NH_3$ produced by the LNT during the entire sequence was a short burst up to about 50 ppm during the last LNT purge (shown in FIG. 6 as the solid curve labeled $NH_3$ 191 C). Quantitative comparisons of the amount of $NH_3$ generated over the LNT vs. the amount of $NO_x$ converted over the booster catalyst following the purge showed that less than 30% of the $NO_x$ conversion can be theoretically accounted for by the amount of $NH_3$ generated. The results shown in FIG. 6 demonstrate that the booster catalyst does not function as an $NH_3$-SCR catalyst.

Figure 7:
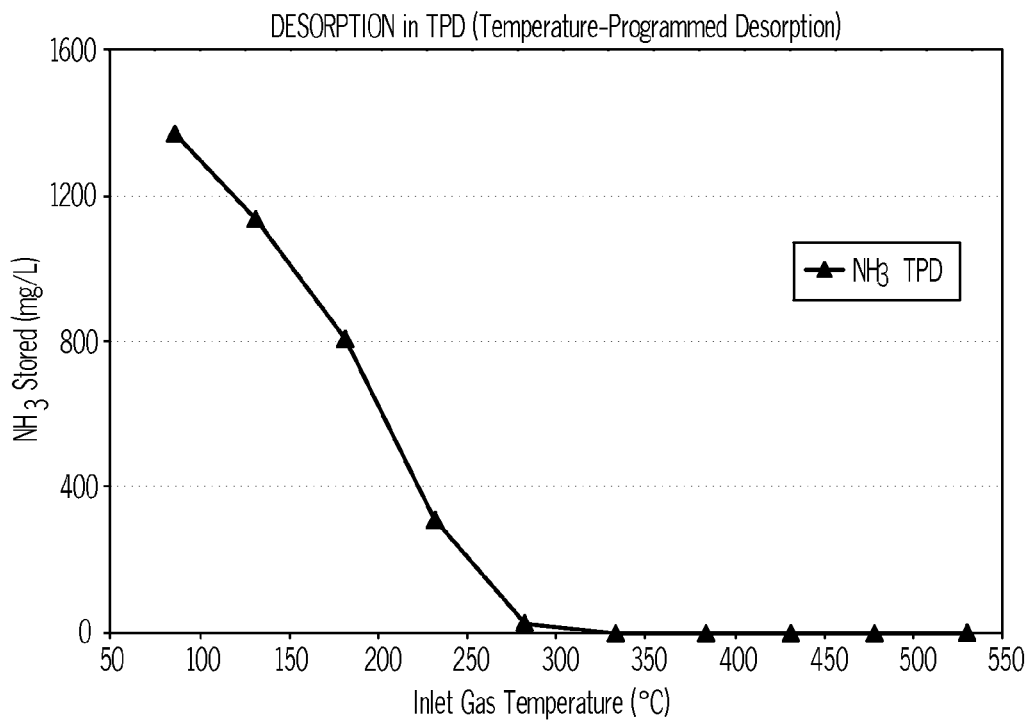
FIG. 7 is a graph illustrating NH$_3$ released in a subsequent temperature programmed desorption (TPD) above the indicated temperature for a booster catalyst previously exposed to a flowing gas stream containing 350 ppm NH$_3$.

FIG. 7 further illustrates typical ammonia adsorption and desorption laboratory data showing that ammonia stored on a booster catalyst (of the type used in the vehicle studies above) in the presence of a flowing stream containing 350 ppm $NH_3$ is immediately desorbed at temperatures above about 280° C. upon removing $NH_3$ from the flowing gas stream. Thus, the enhanced conversion observed over the booster catalyst following the purge at about 1980 seconds in FIG. 6 cannot be ascribed to $NO_x$ reacting with stored $NH_3$, as the temperature of the booster catalyst is at least 370° C., i.e., well above temperatures at which $NH_3$ will desorb from the booster catalyst.

EXAMPLE 5

Figure 8:
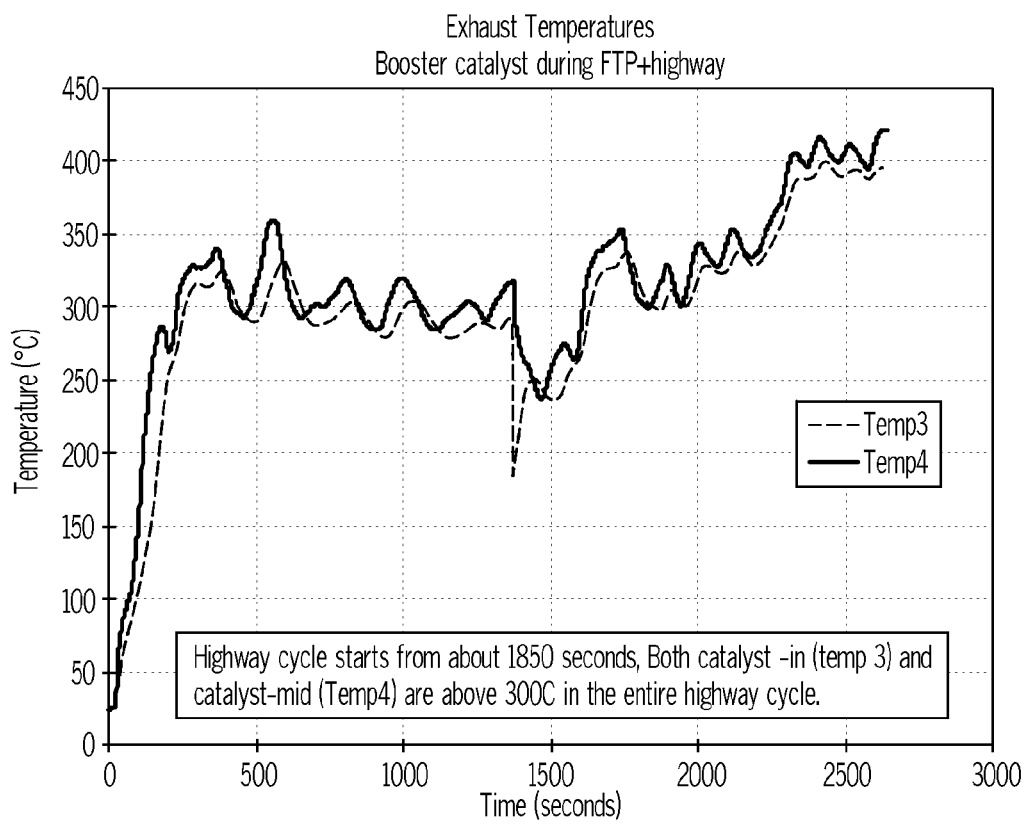
FIG. 8 is a graph illustrating exhaust temperature data measured on a 2.7 L diesel vehicle at the inlet and mid-bed of the booster catalyst during the combined FTP city-highway cycle.
Figure 9:
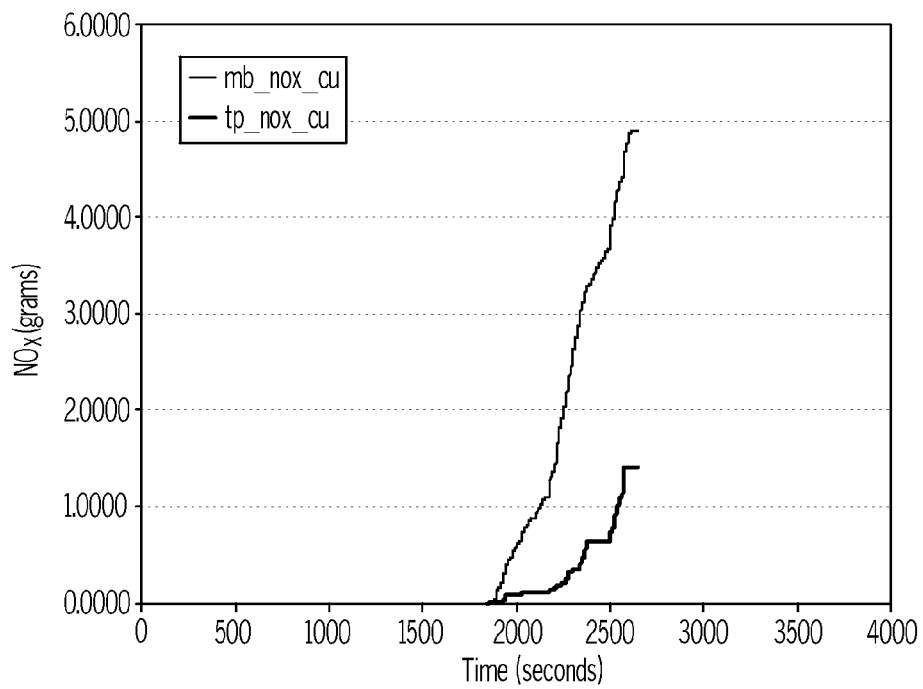
FIG. 9 is a graph of cumulative $NO_x$ emissions measured immediately before and after the booster catalysts during the highway portion of the combined FTP city-highway cycle.

FIGS. 8 and 9 illustrate vehicle data for an LNT-booster catalyst system obtained on the combined U.S. Federal Test Procedure (FTP) City and Highway driving cycle. As shown in FIG. 8, the highway part of the cycle began at about 1850 seconds. The exhaust temperatures measured at both the inlet and mid-bed of the booster catalyst were greater than or equal to 300° C. throughout the entire highway portion of the cycle. FIG. 9 shows a comparison of the cumulative $NO_x$ emissions measured before the booster catalyst bricks (mb_nox_cu) and after the bricks (tp_nox_cu) as a function of time during the highway portion of the cycle. The difference between the two measurements is equivalent to 71% conversion of $NO_x$ that passes through the LNT and contacts the booster catalyst. $NH_3$ storage on the booster catalyst formulation was negligible under the highway cycle test conditions.

EXAMPLE 6

Figure 10:
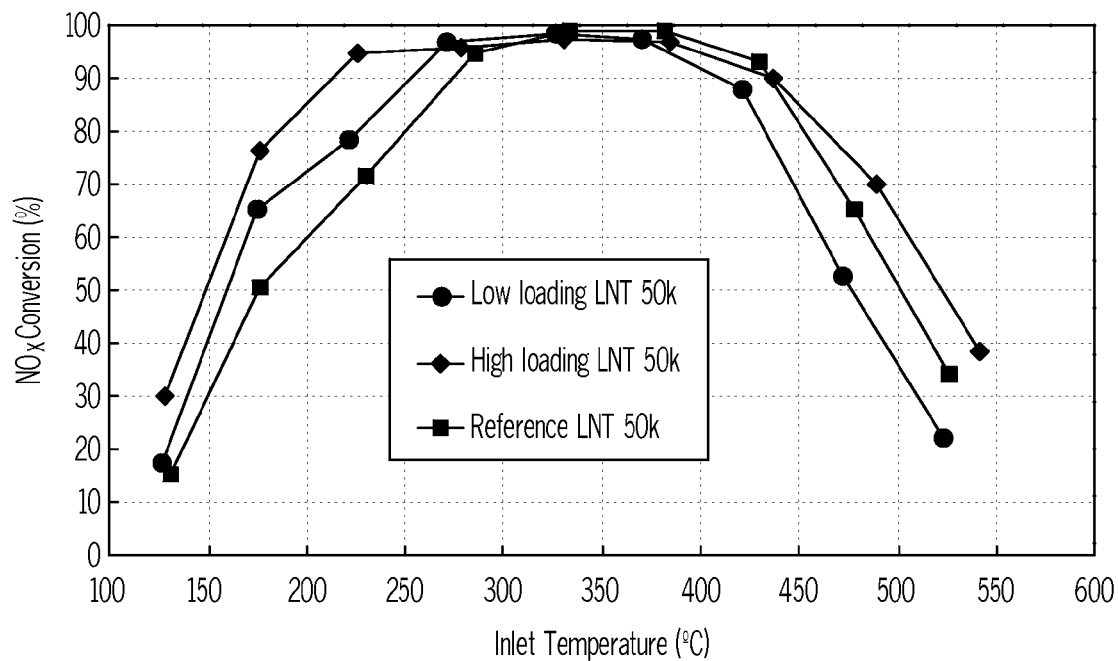
FIG. 10 is a graph illustrating a comparison of $NO_x$ conversion over a low-loaded LNT, high-loaded LNT, and reference LNT, after 50,000 mile simulated vehicle aging.
Figure 11:
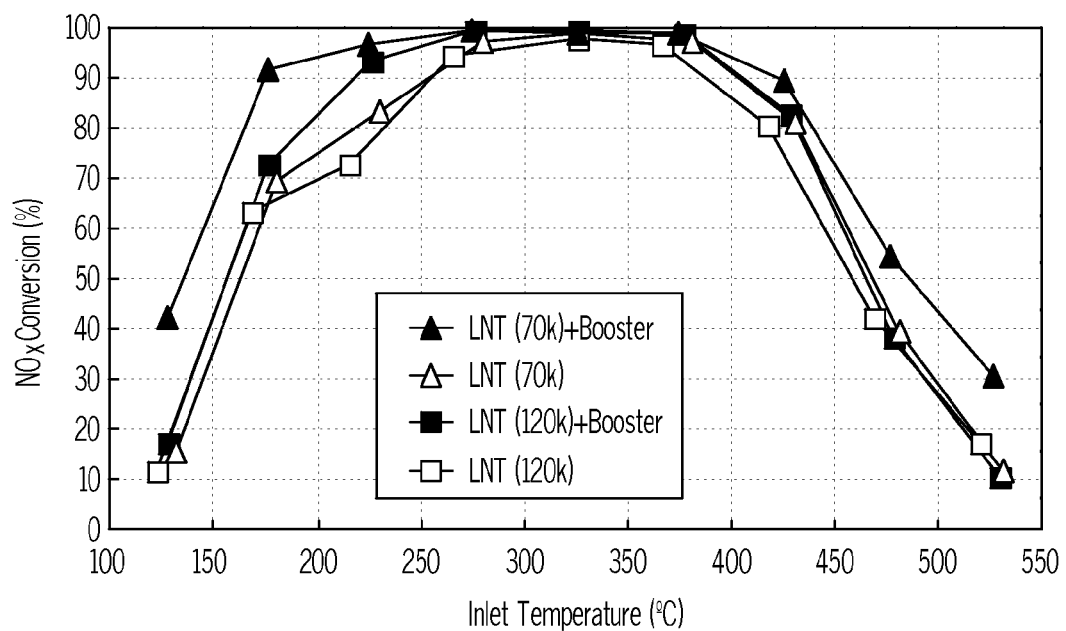
FIG. 11 is a graph illustrating $NO_x$ conversion as a function of temperature for a low-loaded LNT with and without booster catalyst after 70,000 and 120,000 mile simulated aging.

An LNT formulation from Johnson Matthey was loaded at a PGM level of 84 g/ft$^3$. FIG. 10 shows a laboratory comparison of the same LNT formulation with a 120 g/ft$^3$ formulation tested with a simulated exhaust gas composition at a 60 second lean/5 second-rich cycling period. Data are also shown for a reference LNT. All samples were laboratory aged in a process that simulates 50,000 miles of use on a vehicle. The lower-loaded LNT shows marked deficiencies in $NO_x$ conversion with respect to the higher-loaded LNT below about 250° C. and above about 400° C. FIG. 11 illustrates $NO_x$ conversion over a broad temperature range for both 70,000 and 120,000 simulated mile aging of the LNT and booster catalyst cores. Not only did the LNT-booster catalyst combination show better $NO_x$ conversion relative to the LNT alone at both aging levels, the mile aged system showed better $NO_x$ conversion than the less severely aged (50,000 mile) higher-loaded LNT by itself (FIG. 10). The 70,000 mile aged LNT-booster catalyst (FIG. 11) demonstrated $NO_x$ conversion in excess of 90% over a temperature range of 175° C. to 425° C.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An exhaust aftertreatment system comprising:
a lean $NO_x$ trap positioned in an exhaust gas passage of an engine for receiving exhaust gas containing $NO_x$ and for reducing at least a portion of said $NO_x$ to $N_2$; said lean $NO_x$ trap comprising one or more platinum group metals and having a total platinum group metal loading of less than about 90 g/ft$^3$; and
a booster catalyst for enhancing $NO_x$ conversion without the use of ammonia as a primary reductant, said booster catalyst consisting essentially of one or more transition metal-exchanged zeolites positioned downstream from said lean $NO_x$ trap configured to further reduce $NO_x$ content in said exhaust gas; wherein said system does not include an $NH_3$-SCR catalyst.

2. The system of claim 1 providing $NO_x$ reduction of greater than about 80% at a temperature range of between about 175° C. and 450° C.

3. The system of claim 1 providing $NO_x$ reduction of at least 90% at a temperature range of about 200° C. to 425° C.

4. The system of claim 1 providing $NO_x$ reduction of at least 95% at a temperature range of about 300° C. to 400° C.

5. The system of claim 1 wherein said lean $NO_x$ trap has a precious metal loading of between about 60 to about 80 g/ft$^3$.

6. The system of claim 1 wherein said lean $NO_x$ trap further comprises a $NO_x$ adsorbent material selected from one or more alkali or alkaline earth metals.

7. The system of claim 1 wherein said lean $NO_x$ trap comprises a mixture of platinum, palladium, and rhodium.

8. The system of claim 1 wherein said booster catalyst comprises Cu- or Fe-exchanged zeolites.

9. The system of claim 1 including an exhaust gas mixer positioned between said lean $NO_x$ trap and said booster catalyst.

10. The system of claim 9 wherein said exhaust gas mixer has a pre-established mixing volume and includes optional gas mixing elements.

11. The system of claim 1 including at least one sensor for determining when said lean $NO_x$ trap needs to be purged.

12. The system of claim 1 including at least one sensor for determining when said lean $NO_x$ trap purging needs to be terminated.

13. The system of claim 1 including a second lean $NO_x$ trap comprising one or more platinum group metals and having a total precious metal loading of greater than about 110 g/ft$^3$; said second lean $NO_x$ trap being used in combination with said lean $NO_x$ trap having a precious metal loading of less than 90 g/ft$^3$; wherein said second lean $NO_x$ trap is positioned upstream from said lean $NO_x$ trap.

14. The system of claim 13 wherein said second lean $NO_x$ trap has a total precious metal loading of between about 90 and 150 g/ft$^3$ and said lean $NO_x$ trap has a total precious metal loading of between about 30 and 90 g/ft$^3$.

15. A method for treating exhaust gases to reduce the $NO_x$ content thereof comprising:
providing an exhaust aftertreatment system in the exhaust gas passage of an engine comprising a lean $NO_x$ trap for reducing at least a portion of $NO_x$ in said exhaust gases to $N_2$ and a booster catalyst positioned downstream from said lean $NO_x$ trap for further reducing $NO_x$ to $N_2$ without the use of ammonia as a primary reductant, said booster catalyst consisting essentially of one or more transition metal-exchanged zeolites, said lean $NO_x$ trap comprising one or more platinum group metals and having a total precious metal loading of less than about 90 g/ft$^3$; wherein said system does not include an $NH_3$-SCR catalyst; and
exposing said aftertreatment system to exhaust gas containing $NO_x$ such that at least 80% of said $NO_x$ is converted to $N_2$ at a temperature between about 175° C. and 450° C.; wherein less than 50% of the $NO_x$ reacted at said booster catalyst reacts with ammonia that is generated during operation of said system.

16. The method of claim 15 wherein at least 80% of said $NO_x$ reduction which occurs at said booster catalyst at a temperature between about 200° C. and 350° C. occurs without the production of ammonia.

17. The method of claim 15 wherein said lean $NO_x$ trap has a platinum group metal loading of between about 60 to about 80 g/ft$^3$.

18. The method of claim 15 wherein said booster catalyst comprises a transition metal-exchanged zeolite.

19. The method of claim 18 wherein said booster catalyst comprises a Cu- or Fe-exchanged zeolite.

20. The method of claim 15 including purging said lean $NO_x$ trap periodically; wherein the air-fuel ratio is maintained at less than 1.0 during said purge, and wherein less than a 400 ppm spike of ammonia is generated during said purge.

21. The method of claim 15 wherein at least 90% of said $NO_x$ is converted to $N_2$, and wherein less than a 400 ppm spike of ammonia is generated as ammonia slip from said lean $NO_x$ trap during purge.

* * * * *